United States Patent
Sinn et al.

[19]

[11] Patent Number: 6,142,580
[45] Date of Patent: Nov. 7, 2000

[54] ELECTROPNEUMATIC BRAKE CABLE SYSTEM

[75] Inventors: Richard E. Sinn, Watertown, N.Y.; Brett A. Pierce, Arden, N.C.

[73] Assignee: New York Air Brake Corporation, Watertown, N.Y.

[21] Appl. No.: 09/078,536

[22] Filed: May 13, 1998

Related U.S. Application Data

[60] Provisional application No. 60/026,039, Sep. 13, 1996.

[51] Int. Cl.[7] .............................. B60T 13/66; H01B 7/00
[52] U.S. Cl. ....................... 303/20; 174/72 A; 174/113 R
[58] Field of Search .................................. 174/68.1, 68.2, 174/68.3, 110 R, 113 R, 70 R, 71 R, 72 R, 72 A, 72 C, 727 R; 303/3, 7, 15, 20

[56] References Cited

U.S. PATENT DOCUMENTS

| | | | |
|---|---|---|---|
| 1,837,962 | 12/1931 | Hensgen | 174/72 A |
| 2,933,550 | 4/1960 | Cole et al. | 174/72 A |
| 3,610,814 | 10/1971 | Peacock | 174/72 A |
| 5,536,904 | 7/1996 | Kojima et al. | 174/72 A |
| 5,734,989 | 3/1998 | Woodcock | 303/15 |
| 5,917,151 | 6/1999 | O'Brien et al. | 174/72 A |

*Primary Examiner*—Robert J. Oberleitner
*Assistant Examiner*—Robert A. Siconolfi
*Attorney, Agent, or Firm*—Barnes & Thornburg

[57] ABSTRACT

A cable system including device connectors connected to electropneumatic valves and electrical sensors at predetermined positions along a path on a common manifold and a wiring harness having a length sufficient to transverse the path. The wiring harness includes a plurality of insulated wires in a common sheath and selectively connected to harness connectors which are mounted at predetermined positions to the harness and mate with a corresponding device connector. The path is a closed loop and the wiring harness forms a corresponding closed loop. The majority of the wires in the wiring harness form the corresponding close loop.

14 Claims, 10 Drawing Sheets

ELECTROPNEUMATIC BRAKE CABLE SYSTEM

CROSS-REFERENCE

This application claims the benefit of U.S. Provisional Application Ser. No. 60/026,039 filed Sep. 13, 1996 titled Locomotive Brake Control Unit with respect to common subject matter.

BACKGROUND AND SUMMARY OF THE INVENTION

The present invention relates generally to railroad electropneumatic brake equipment and more specifically to a cable system for an electropneumatic brake unit.

The availability of computer controlled railroad brake equipment includes the CCB equipment available from New York Air Brake Corporation. The CCB locomotive brake control equipment is described in U.S. Pat. No. 5,172,316 and a portion of which is illustrated in FIG. 1. The numbers used throughout this application correspond to that used in this patent for sake of clarity and consistency.

With the addition of electropneumatic braking and other electric subsections, there has been a proliferation of new on-board locomotive subsystems. Since the interconnection of these various subsystems have been added one by one, it has increased the complexity of their interconnection and their weight. For example, the complexity of the brake control portion or pneumatic control unit 62 of the CCB is illustrated in FIG. 1. The manifold is complex and wiring from the microcomputer 56 must be connected to each of the individual electrical valves and transducers. Further complexity is added in that electric valves and transducers do not have standard electrical connectors and therefore each of the wires must include a termination or connector which would mate with the respective connector on the transducer or valves. The wires and bundles must be securely positioned on and between the various electropneumatic and pneumatic valves and electrical transducers.

There are thirty-four line replaceable units mounted to this manifold. Since the locomotive cannot carry thirty-four of the individual components, the whole locomotive must be taken into a shop for repair. The complete brake control portion 62 can be removed and a new one inserted. This takes a substantial amount of time because of the number of wires and interconnections for the electrical components. The brake control portion 62 would then have to be tested and the individual parts replaced.

To address these problems, the present invention is a cable system including device connectors connected to electropneumatic valves and electrical sensors at predetermined positions along a path on a common manifold and a wiring harness having a length sufficient to transverse the path. The wiring harness includes a plurality of insulated wires in a common sheath and selectively connected to harness connectors which are mounted at predetermined positions to the harness and mate with a corresponding device connector. The path is a closed loop and the wiring harness forms a corresponding closed loop. The majority of the wires in the wiring harness form the corresponding closed loop.

The mounting of the harness connectors to the harness includes a water-tight seal and preferably is a molded connection. The sheath is discontinuous at the mounting of the harness connectors to the harness to expose the wires. The molded mounting encompasses the exposed wires, the ends of the sheath at the discontinuity and a portion of the harness connector. Each wire in the harness is connected to more than one of the harness connectors. Each harness connector includes a pin for each wire selectively connected thereto. Corresponding pins of the harness connectors are interconnected one to another by continuous segment of wire of the harness. A pair of wire segments are connected to each of the selected pins.

Preferably, the electropneumatic valves and electrical sensors, as well as other electronic devices, are grouped into a module mounted to the manifold. Each module includes one device connector for connecting all of the electropneumatic valves, electrical sensors and other electrical components of the module to the harness. A junction box, also provided on the manifold, has a plurality of box connectors interconnected at the junction box. One of the box connectors is positioned along the path and the wiring harness includes a harness connector positioned to mate with the box connector positioned along the path. Each of the modules includes a transceiver connected to its device connector. The junction box includes an electrical power source connected to the box connector along said path. Thus, the wiring harness interconnects the module for communication as well as providing a power source.

Other objects, advantages and novel features of the present invention will become apparent from the following detailed description of the invention when considered in conjunction with the accompanying drawings.

DETAILED DESCRIPTION OF THE PREFERRED EMBODIMENT

Figure 1:
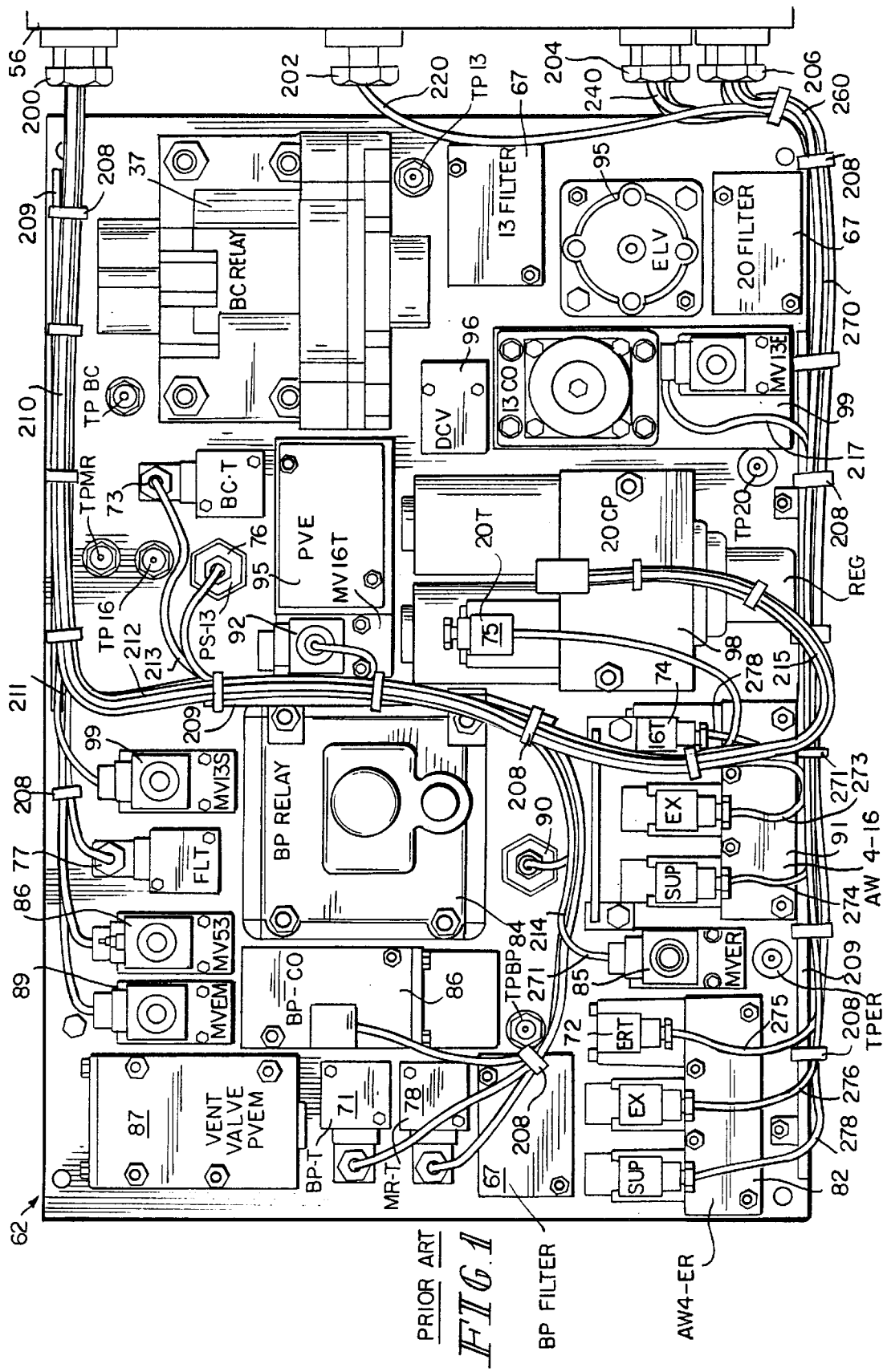
FIG. 1 is a plan view of the brake control portion of the system of the prior art CCB.

The layout of the pneumatic control unit or brake control portion 62 mounted to a manifold or pipe bracket 63 of the prior art is illustrated in FIG. 1. The numbers used are those in the previous mentioned U.S. Pat. No. 5,172,316. The unit includes brake pipe, 13 pipe and 20 pipe filter 67. Brake pipe transducer 71, brake cylinder transducer 73, main reservoir transducer 78 and reservoir flow transducer 77 are mounted directly to the manifold. A pressure switch PS-BP for an emergency pressure sensor 70 for the brake pipe is also provided on the manifold. The pressure sensing port PS-13 for the 13 pipe pressure switch 76 is also shown directly on the manifold. The equalization reservoir transducer 72, brake signal or 16 port transducer 74 and independent or 20 pipe transducer 75 are mounted to their pressure controllers 82, 91 and 98 respectfully.

The actuator or 13 pipe controller 99 is also mounted to the manifold and includes a 13 cut-off valve 13 CO, a 13 magnetic exhaust valve MV13E and a separately mounted supply magnetic valve MV13S. A magnetic valve MVER 83 connecting the equalization reservoir controller 82 to equalization reservoir is mounted on the manifold directly as are brake pipe relay 84 and brake pipe cut-off 86. The brake pipe cut-off 86 includes a piloted pneumatic section BP-CO and its electropneumatic portion MV53. A piloted vent valve PVEM 87 is mounted to the pipe bracket to vent the brake pipe and is controlled by an electropneumatic valve MVEM 89. The output of the control reservoir pressure control 91 is connected through tow cut-out valve MV16T 92. The emergency valve PVE 95 and double check valve DCV 96 are also mounted on the manifold. The output of the double check valve 96 controls the brake cylinder relay 37 also mounted to the manifold. Test points TP are provided throughout the manifold.

The microcomputer 56 is connected to the brake control portion 62 via strain reliefs 200, 202, 204 and 206 and corresponding wire bundles 210, 220, 240 and 260. Each of the wire bundles includes one or more insulated wires held together by wire ties 208. Brackets 209 are mounted to the manifold 63 and the wire ties 208 also mount the wire bundles to the bracket 209. The brackets 209 are adjacent the top and bottom edge and are horizontally and one vertical bracket is substantially close to the center of the manifold.

The wire bundle 210 has a first branch 211 which is connected to the magnetic valves 86, 89, 99 and flow detector 77. A second branch 212 runs vertically with a third branch thereof 213 going to the pressure sensor 76 and brake cylinder transducer 73. Branch 212 is also connected to magnetic valve 92 and the 20 transducer 75. A branch 214 off branch 212 is connected to brake pipe transducer 71, main reservoir transducer 78 and brake pipe cut-off 86. A wire 271 from bundle 270 is included in bundle 214 and is connected to magnetic valve 83. Branch 215 off branch 212 is connected to the 20 pipe control pressure controller 98. Wire 217 from branch 212 is connected to the exhaust magnetic valve MV13E of the 13 pipe control 99 and is included with bundle 270.

Wire 220, a plurality of wires in bundle 240 and a plurality of wires in bundle 260 form a common wire bundle 270 running along the bottom edge of the manifold 63. Bundle 270 also has wire 217 from bundle branch 212 bound therein.

Bundle 270 includes a first wire 271 which is bound with bundle 212 and 214 to connect to the emergency reservoir magnetic valve 83. The bundle 270 includes wires 272, 273 and 274 connected to the 16 transducer 74 and the exhaust and supply valves of the 16 pressure controller 91. Wires 275, 276 and 278 of bundle 270 are connected to the equalization reservoir transducer 72 and the exhaust and supply valves of the equalization reservoir pressure controller 82.

It should be noted that the triple valve response to the brake pipe is not shown since in the CCB, it is not mounted on the manifold with the other elements. A review of FIG. 1 indicates that there are a substantial number, thirty-four, line removable elements mounted to the manifold. All of the elements related to one particular function are not mounted in a single module, and thus cannot be removed as a single module for replacement repair or elimination of that function. Similarly, different line removable elements are mounted by different fasteners and nuts and therefore a multitude of tools are needed in order to service the pneumatic control unit.

It should also be noted that various wire bundles 210, 220, 240 and 260 carry different wires and must be provided in various bundles and take securitous path along the face of the manifold 63. The wire 217 for the exhaust valve for the 13 pipe pressure controller, runs from the top of the manifold down the center to be rebundled with bundle running across the lower portion of the manifold. Similarly, bundle 215 going to the 20 pipe pressure controller 98 runs from the top down the center and then back up a substantial portion of the face of the manifold for its connection. Also, each of the elements, or line replaceable units, has a different connector dictated by the element being used. In the wiring scheme of the prior art of FIG. 1, there are, for example, 20 wires, each requiring a separate connector. Thus, there are 20 connectors which must be sealed against the environment the harsh environment. This increases the number of entries for possible electric failure.

It should be noted that in the Figures the fluid lines of the pneumatic system will be illustrated by thick (FIGS. 3 and 6-8) lines whereas the electrical interconnections will be illustrated by thin (FIGS. 3 and 6-8) lines. Wherever possible, the elements in the figures will have the same numbers as those of the prior art described in FIG. 1. All modifications will have a reference number in the 100s.

Figure 2:
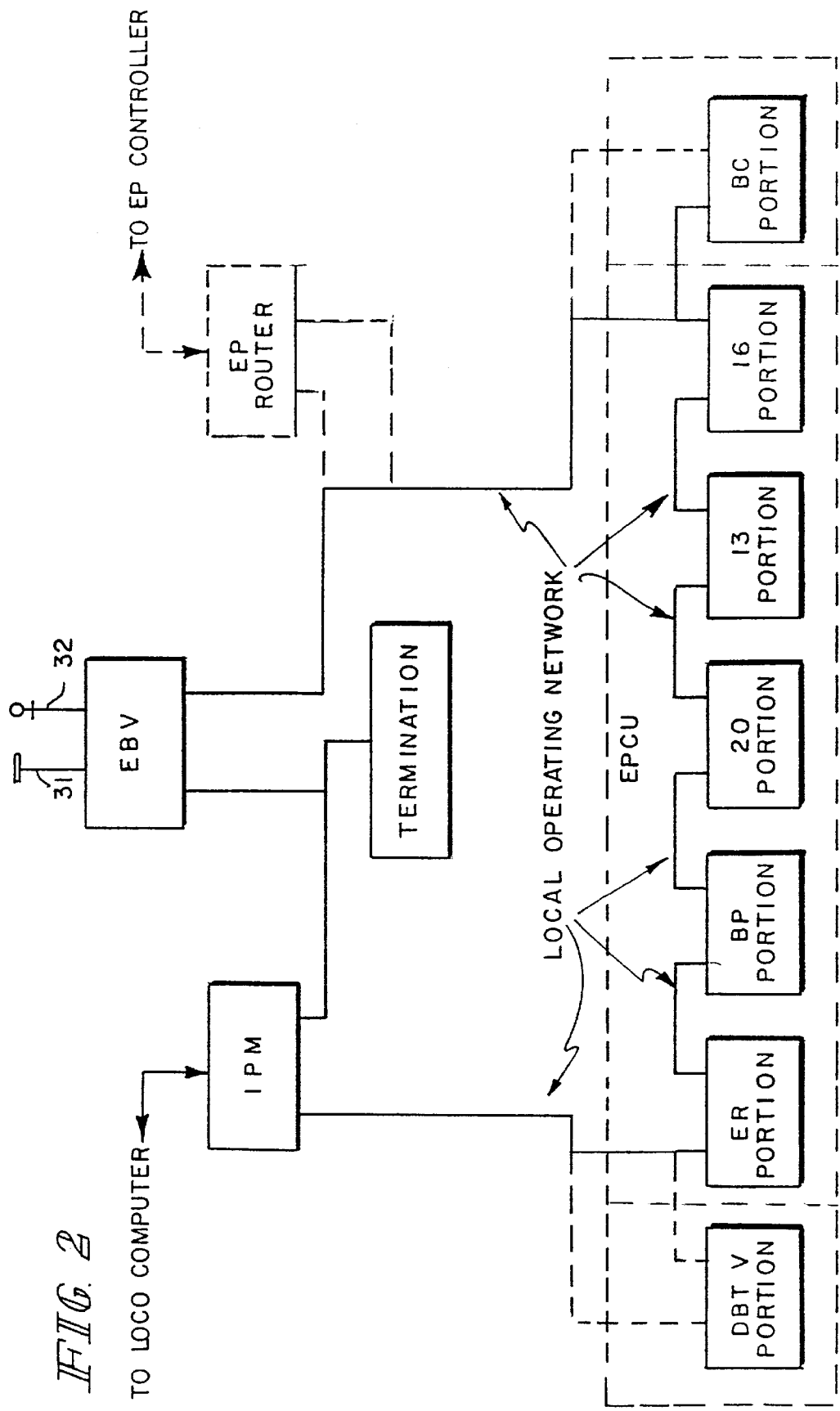
FIG. 2 is a schematic representation of a new locomotive control unit.
Figure 3:
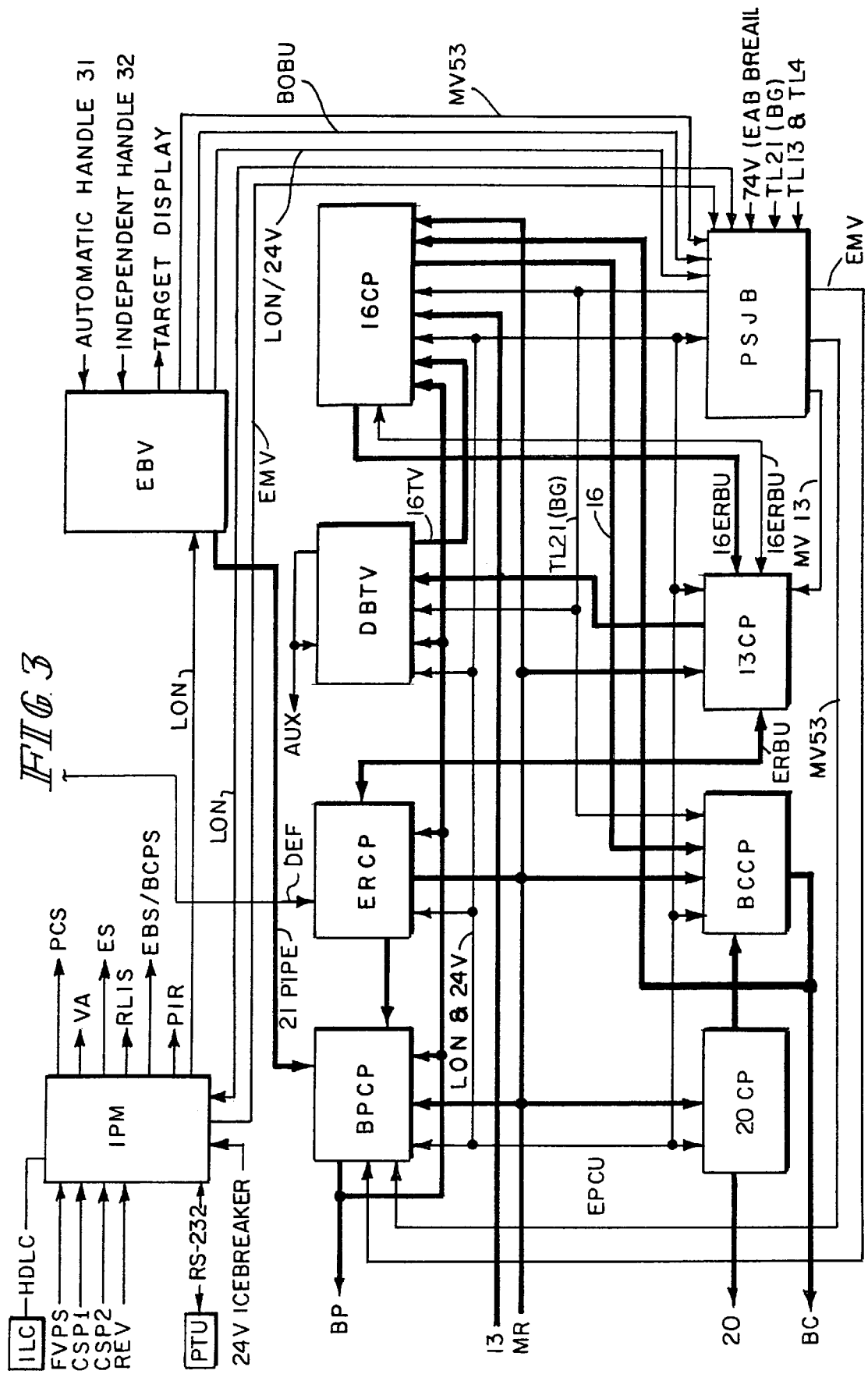
FIG. 3 is a block diagram of the locomotive control unit of FIG. 2.

An overview of the locomotive brake control unit according for use with the present invention is illustrated in FIG. 2. The system includes electronic brake valve EBV which serves as the input portion through the human-machine interface. The electronic brake valve EBV includes the automatic brake handle 31, independent brake handle 32 and a bailoff switch. As a failsafe feature, the electric brake valve EBV operates a direct acting emergency venting of the brake pipe.

An integrated processor module IPM is the host computer for distributed power in an electronic air brake system. The IPM manages the electrical interfaces between the brake system, the locomotive and the train. It communicates with integrated locomotive and interfaces electrical trainlines. The IPM can communicate with a portable testing unit for running system diagnostic tests and trouble shooting. It also has the ability to handle and/or include distributed power with the appropriate hardware and software upgrades. The IPM provides high level brake control logic and locomotive system integration communication or interfacing. It should be noted that a preferred distributed power system is LOCOTROL Distributed Power available from GE-Harris.

An electropneumatic control unit EPCU manages the pneumatic interface between the brake system, the locomotive and the train. It controls the locomotive brake cylinders, brake pipe, independent application and release pipe and the actuating pipe. The electropneumatic control unit includes those portions of the system which relate to the individual pipes. Each of the portions includes electronics and pneumatics which combined into an integral line replaceable units or modules. Each line replaceable unit reflects basic operational entity within the system, can be ready-track replaced in twenty minutes using a single wrench and be light enough to be moved by a single person. The electronics of each of the line replaceable units are potted, are a standard configuration and are independent of each other. As can be seen from FIG. 2, the electropneumatic control unit EPCU includes only seven replaceable units as compared to the thirty-four of FIG. 1 of the prior art.

The different portions of the locomotive control unit are interconnected by an Echelon LonWorks Network, although other networks may be used. This not only interconnects the modules of the EPCU, but also connects the EPCU to the IPM, EBV and the EP router. The system also has the capability of communicating with electropneumatic controls to each of the individual cars through the EP router. The intercommunication of the line replaceable units also allows communication between the line replaceable units or modules and allows a backup or redundancy of one unit for another.

Figure 8:
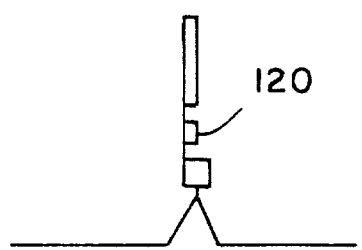
FIG. 8 is a schematic representation of a junction of two wires at a pin for the wiring harness according to the principles of the present invention.

A more detailed illustration of the electrical, mechanical and pneumatic interconnection of the elements of the system are illustrated in FIG. 8. The integrated processor module IPM is shown connected to and integrated locomotive computer ILC, and to a portable test unit PTU by an RS 232 connection. The other inputs to the IPM are from the propulsion and dynamic braking controller.

The independent brake handle 32 provides electrical signals through to the control node of the EBV. The electronic bail-off signal from the independent handle portion 32B provides a first bail-off signal to the control node and a second bail-off signal as an output signal BOBU as a bail-off signal to the bail-off portion of the EPCU. The automatic handle 31 provides an automatic emergency signal MV53 to the EPCU to vent the brake pipe.

The electropneumatic control unit EPCU includes the brake pipe control module BPCP, an equalization reservoir control portion ERCP, a dead-in-tow triple valve DBTV, a brake signal or 16 pipe control portion 16 CP, an independent or 20 pipe portion 20 CP, a brake cylinder control portion BCCP, an actuating pipe or 13 pipe control portion 13CP and a power supply and junction box PSJB. Each of these modules are line replaceable units with the electrical and interconnection being in the narrow lines and the pneumatic interconnection being in the thicker lines. A communication loop is LonWorks and includes a 24 volt power line.

Figure 4:
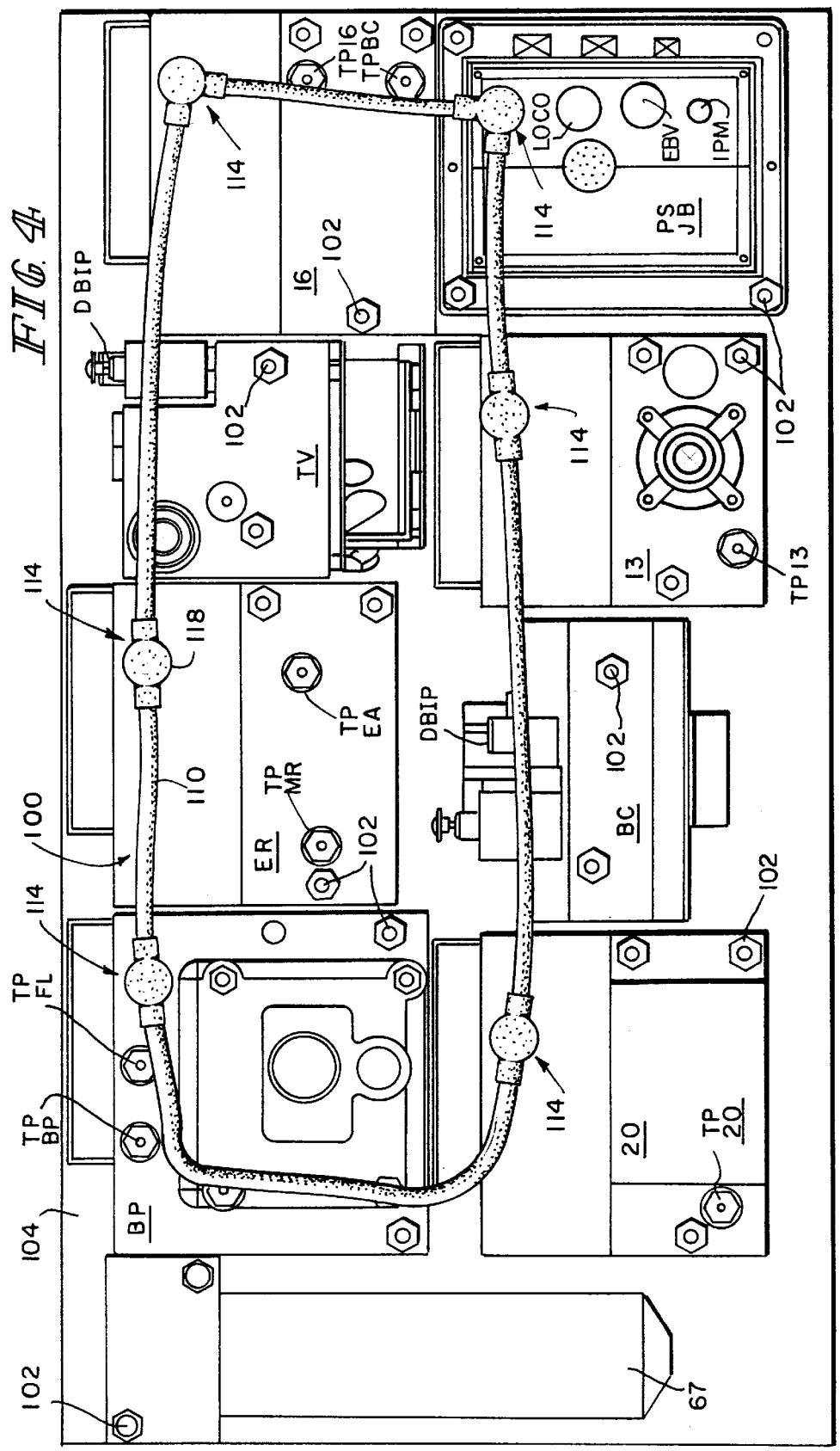
FIG. 4 is a plan view of the electropneumatic control unit incorporating the principles of the present invention.

A view of the individual line replaceable units or modules and interconnection by a single wire harness 100 is illustrated in FIG. 4. A single sized fastener 102 is used to connect each of the line replaceable units to the manifold 104. It should be noted that all of the required filters 67 are also directly mounted to the manifold. Besides the single portion connection or connector for all of the electrical wires using the wiring harness 100, each of the line replaceable modules include the appropriate test points physically on the module. Similarly, each of the modules include the required pressure transducers to be used by their local control node or microprocessor and connection as well as is through the wiring harness.

The wire harness 100 includes all of the electrical interconnection between the individual line replaceable units or modules with each other and to outside control signals via the power supply junction box PSJB. The wire harness 100 defines a path shown as a closed loop with a plurality of harness connectors 114 positioned along the path to mate with device connectors of the individual line replacement units or modules. All of the connections to all of the electrical or electropneumatic components, including electropneumatic valves, electrical sensors and other electronic elements within the module are through the single device connector and its mating harness connector 114. The connection to these elements may be directly or through a control node or microprocessor.

Figure 5:
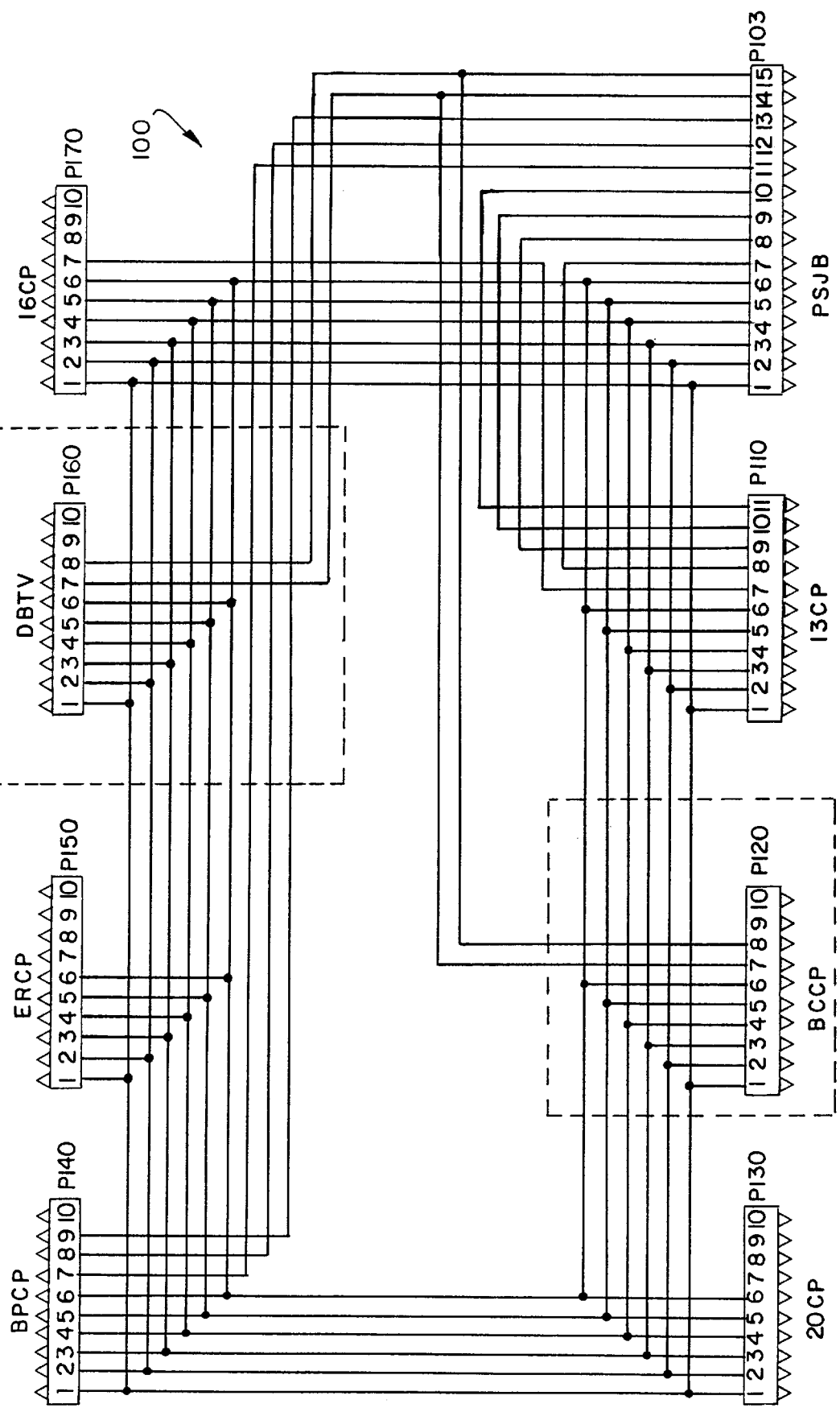
FIG. 5 is a schematic of the wiring harness for the electropneumatic control unit according to the principles of the present invention.
Figure 6B:
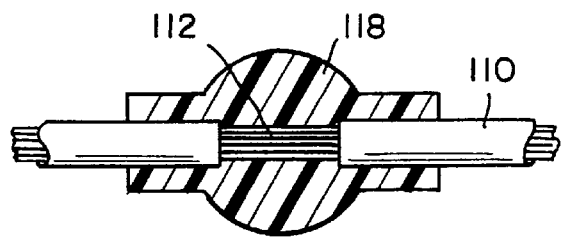
FIGS. 6B and 7B are top cut-away views of the connectors of FIGS. 6A and 7A.
Figure 7B:
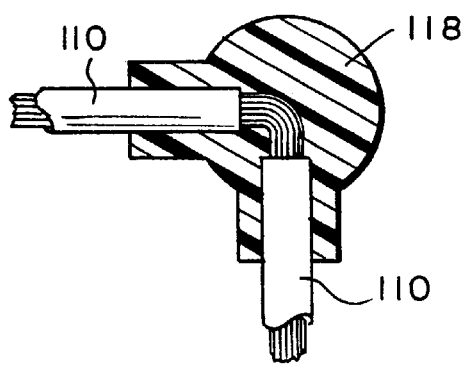
Figure 6A:
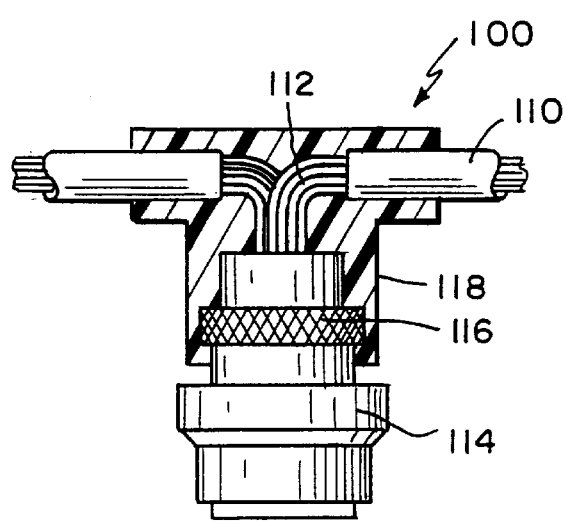
FIGS. 6A and 7A are side cross-section views of wiring harness connectors according to the principles of the present invention.
Figure 7A:
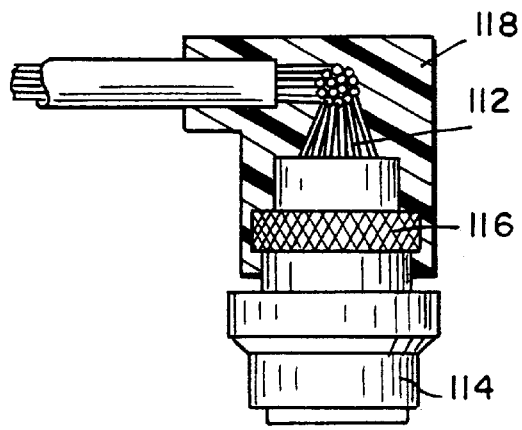

As we will see with respect to FIGS. 5–7, all of the connectors 114 are the same type of connectors having a different number of pins to be made with a single style device connector. By substantially reducing the number of connectors between the outside world and the individual elements on the EPCU, the integrity of system is substantially increased. It should also be noted that by providing all of the wires in a single sheath 110 and molding 118 of the connectors 114 to the cable 100 provides a more compact cabling system in a more defined area with increased rigidity and not requiring additional brackets or connection to the pipe bracket other than at the device and harness connectors.

In the particular embodiment shown in FIG. 4, there is no connection to the brake cylinder portion BC or the triple valve portion TV. Preferably, each of these modules would include a control node or at least some form of communication and therefore, there would be a connection to these modules as well by the wire harness 100. If dynamic brake interlock is provided on either of these modules, a connection through the wiring harness 100 could be made or a direct connection. The schematic of the wiring harness is illustrated in FIG. 5 with the connections being illustrated in FIGS. 6A and B and 7A and 7B and having pin connector in FIG. 8. By using one wiring harness, the interconnectability and replaceability is substantially simplified.

The specific wiring of the wiring harness 100 is illustrated in FIG. 5. The dashed lines around the brake cylinder control portion BCCP and the triple valve DBTV illustrate that these connections may not be provided by the wiring harness in the configuration as in FIG. 4 if there is no control node. The examples of the schematic in FIG. 5 is specifically for use with a specific embodiment of the EPCU as purpose of illustration and example only. The concept of the wiring harness is applicable to other electropneumatic control units and not limited to the specific electropneumatic control unit shown.

Connector P103 has fifteen pins for the power supply junction box PSJB. The first six pins are connected to six lines which run around the complete closed loop of the wire harness 100 and are connected to the first six pins of each of the other harness connectors. The next four pins, 8–10 of connector P103, are connected to pins 8–11 respectively of the 13 control portion 13 CP harness connector P110. The next three pins, 11, 12 and 13 of harness connector P103 are connected to the brake pipe control portion BPCP harness connector P140 at its pin 7, 8 and 9. The last two pins, 14 and 15 of the power supply junction box connector P103 are connected to pins 7 and 8 of the dead-in-tow triple valve DPTV harness connector P160 at pin 7 and 8.

The sixth pin of the 13 control portion connector P110 is connected to the seventh pin of the 16 pipe control portion 16CP harness connector P170. The 20 pipe control portion 20CP connector P130 and the equalization reservoir control portion ERCP harness connector P150, all include only the six pins connected in common to all of the other harness connectors. The common connected pins 1–6 of the wire harness 100 carries the Lon Communications Network as well as a power to the individual line replacement units or modules. Additional signals carried by the common lines could include discrete wired signals for back up use in case part of the electronic system should fail.

As will be explained more fully below with respect to FIGS. 6–8, the connection of the individual pins or connectors 114 to the wiring harness 100 would appear to be a splice with a tail or an additional wire running to the respective pins. This is not the case in that the connections made to the pin by cutting the connectors and bringing both terminations down to the pin and joining them to the pin. Thus, the pins of adjacent connectors are connected by continuous segment of wire.

The details of the wiring harness are illustrated in FIGS. 6A and B and 7A and B. The harness 100 includes an insulative cover or sheath 110 having a plurality of individually insulated wires 112 therein. Wires 112 extend to a connector 114 which connects the harness to the individual modules. The cover 110 and wires 112 are molded by 118 to the connector 114 to provide a water tight seal. The environment in which the cable is exposed has temperature ranges from −40 to +80 degrees centigrade, vibration, contaminants such as oil, salt or sand and water, and substantial physical abuse.

If wire is not needed at a terminal, it may bypass the connector 114. For any particular wire which is to be provided at the terminal through connector 114, that particular wire is cut-out of the sheath 110 and the two ends are joined together at an appropriate pin connection, for example, 120 is illustrated in FIG. 8. Since both ends are connected to the pin connection, no additional splicing is required. Because of the connection used in FIG. 8, two wires generally are inserted through the rubber seal of the connector 114. This has a tendency to destroy the integrity of the seal. Thus, the molding 118, for example, a urethane back shell, over the back of the connectors 120 and the wires 112 provide the water tight seal.

To further illustrate the present cable system, the connections to, for example, the power supply junction box, the brake pipe control portion BPCP, the 16 pipe control portion 16 CP, and the 13 pipe control portion 13 CP are illustrated in FIG. 9–12. This will illustrate the point that all of the electrical electropneumatic valves transducers and devices are connectable through a single connector to the wire and harness.

Figure 9:
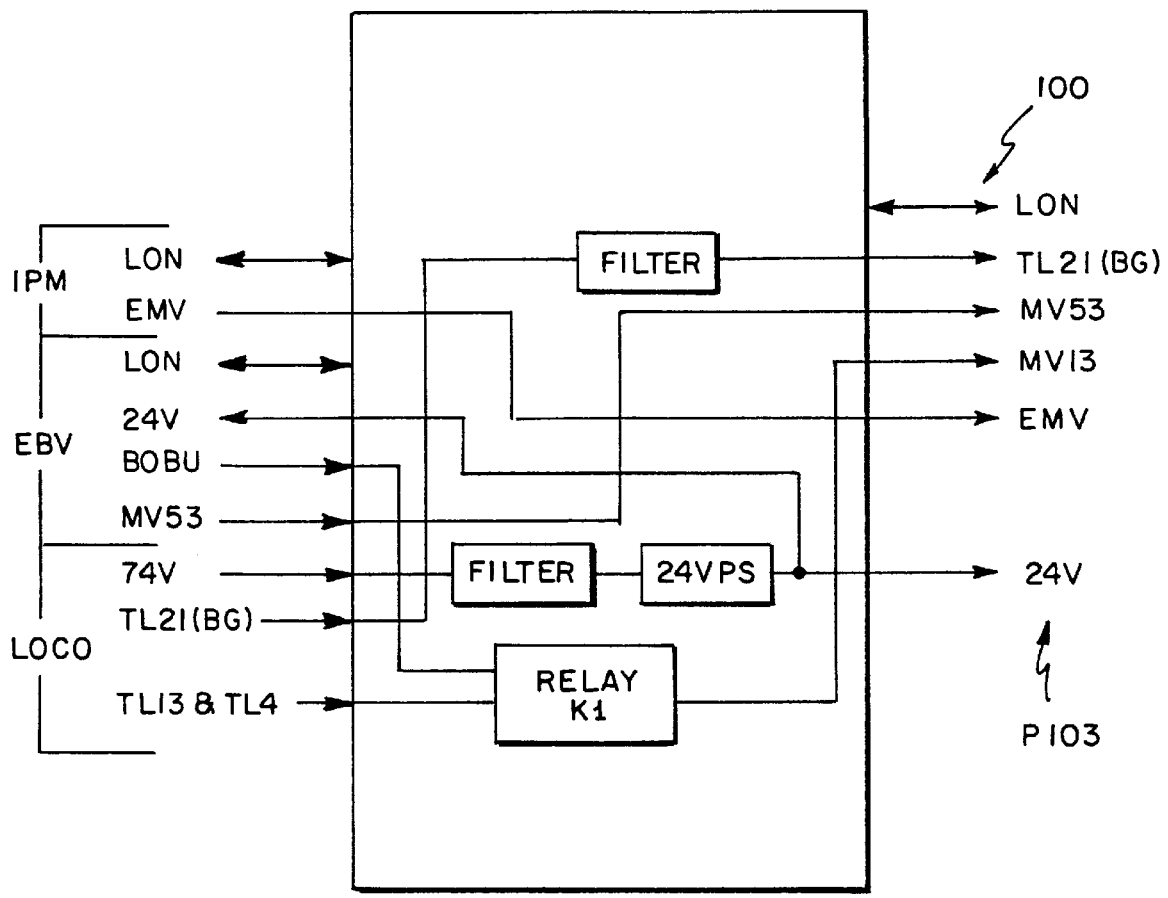
FIG. 9 is a block diagram of a power supply junction box for use with a cable system of the present invention.

A block diagram of the power supply and junction box PSJB is illustrated in FIG. 9. The inputs from the locomotive are 74 volt input, trainline 21 which is the dynamic brake begin signal and trainlines TL13 and TL4 which are the positive and negative lines. The interface with the electric brake valve EBV are LonWorks communication line LON, and 24 volts power supply which is produced by a filter and 24 volt power supply from the 74 volt input from the locomotive. A bail-off back-up signal BOBU which provided to the relay K1 as an input to relay K1, and the vent signal MV53 for magnetic valve 53 of the EPCU to vent the brake pipe. The input from the integrated processor module IPM is the LonWorks line LON and the emergency vent signal EMV.

The device connector for harness connector P103 includes the following. The dynamic brake signal TL 21 is provided through a filter as an output to an output TL 21 to the line replaceable units. The bail-off back-up signal BOBU is provided through the relay K1 to magnetic valve MV13 of the line replaceable unit for the 13 portion. An automatic emergency signal MV53 from the electrical brake valve is provided as an output MV53 to the brake pipe control portion BPCP. The LonWorks line LON, and emergency vent signal EMV are provided as an output. The output of the 24 volt power supply is also provided as an output to the line replaceable units.

Although individual cables bring the input from the IPM, EBV and LOC to the power supply junction box, all of the electrical outputs to the line replacement units or modules are preferably via the wire harness 100. By mounting the power supply injunction box PSJB on the manifold 104, the manifold acts as a heat sink for the power supply. This provides a substantial mass of metal as a heat sink. It reduces the physical size of the power supply since an additional heat sink is not required. The heat does not adversely affect the operation of the pneumatics.

Figure 10:
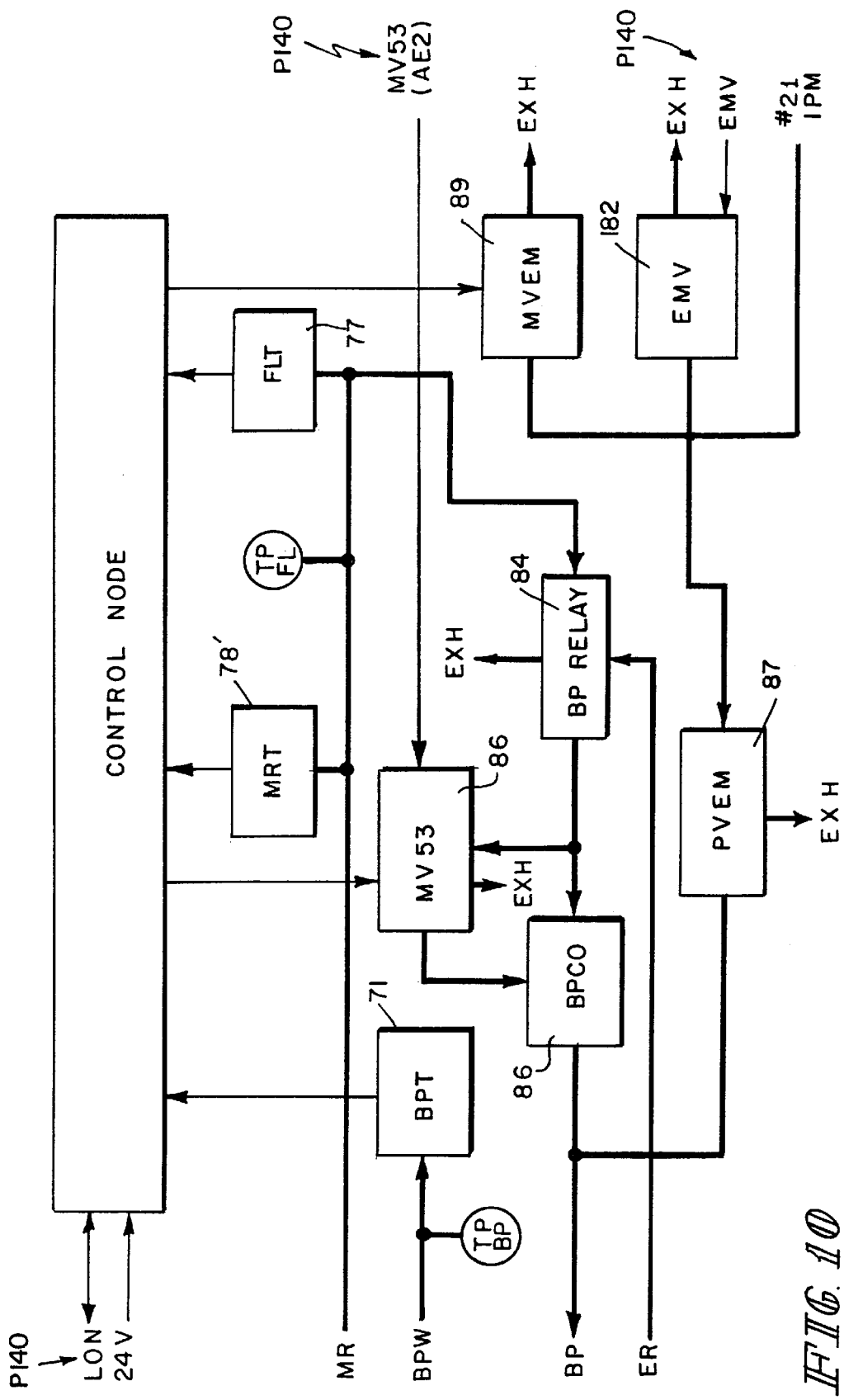
FIG. 10 is a block diagram of the brake pipe control portion for use with a cable system of the present invention.

The brake pipe control portion or module BPCP as illustrated in FIG. 10 includes a control node interconnected to the LON and receiving a 24 volt power signal by device connector P140. The main reservoir is connected to the brake pipe control module which includes a second main reservoir transducer 78' and main reservoir flow transducer 77. A flow test point TPFL is also provided. The main reservoir MR is also connected to the brake pipe relay valve 84 which receives a control signal from the equalization reservoir ER. The output of the brake pipe relay 84 is provided to the pneumatic brake pipe cut-off valve 86 which receives a control signal from an electropneumatic MV53. MV53 is controlled by the control node and also receives an electric signal MV53 at device connector P140 from the automatic handle 31 of the electric brake valve EBV through the power supply junction box PSJB. The brake pipe transducer 71 is connected to the brake pipe at the vent valve at either end of the locomotive and provides its output to the control node. A brake pipe pressure test point TPBP is also provided.

The brake pipe control portion BPCP includes brake pipe venting independent of the brake pipe relay 84. A pneumatic brake pipe vent valve PVEM 87 vents the brake pipe in response to pneumatic signals. One of the pneumatic signals is the 21 pipe from the automatic handle 31 of the electric brake valve EBV. The second pneumatic input for the brake pipe vent valve 87 is from electropneumatic valve MVEM 89. It receives its control signal from the local control node. An additional electropneumatic valve, EMV 182 is provided to provide a pneumatic signal to activate the brake pipe vent valve 87 in response to an electrical signal EMV at connector 140 from the integrated processor module IPM via PSJB.

Figure 11:
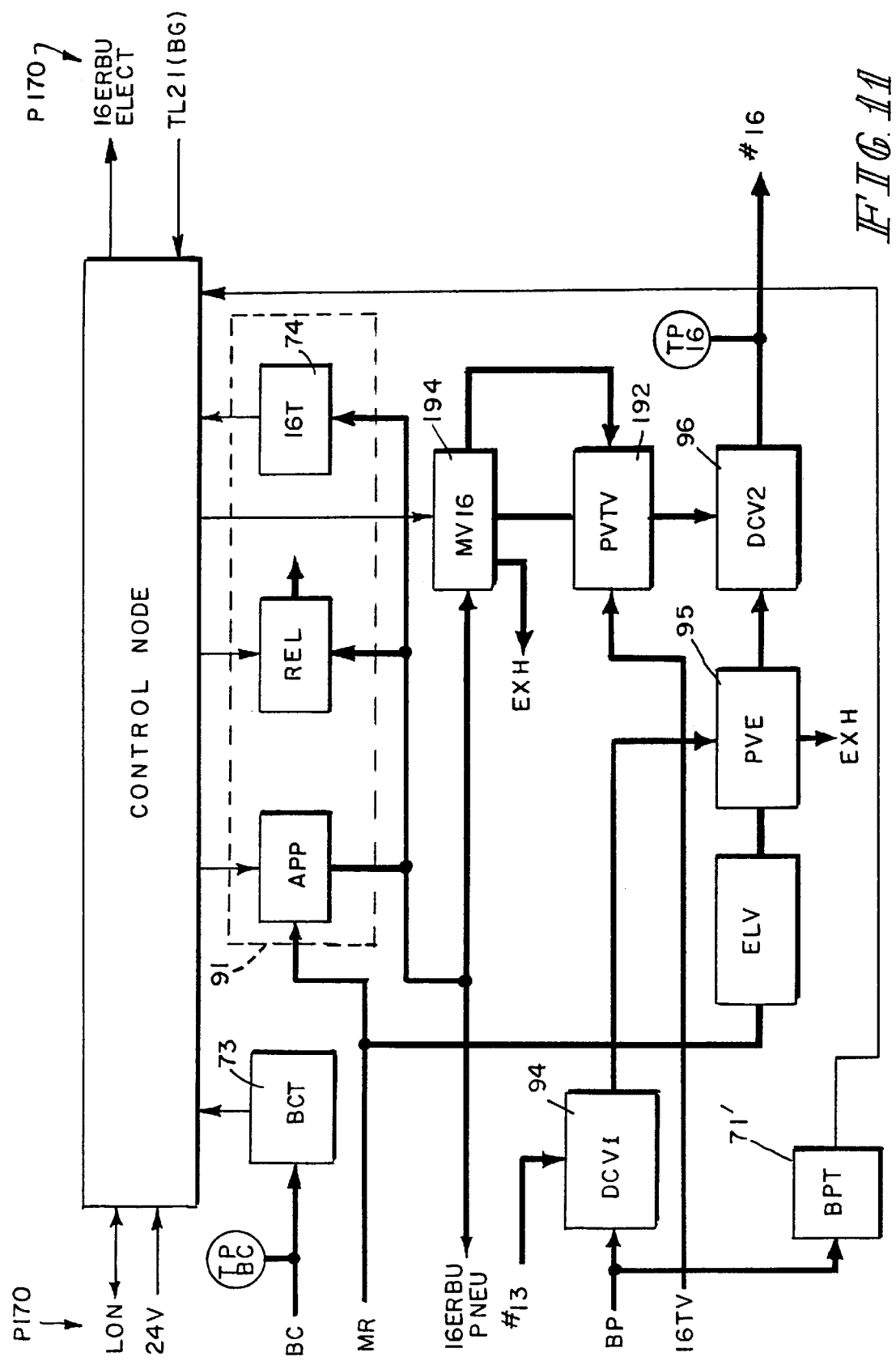
FIG. 11 is a block diagram of the brake signal or 16 pipe control portion for use with a cable system of the present invention.

The 16 pipe control portions 16CP or brake signal portion includes a control node connected to the LON and receives the 24 volt power at connector P170 as shown in FIG. 11. The brake cylinder is monitored by brake cylinder transducer 73 and also includes a brake cylinder test point TPBC. The main reservoir MR is connected to the control reservoir pressure controller 91 which include apply and releases valves under the control of the control node with their output monitored by the 16 pipe transducer 74. The output of the control reservoir pressure controller 91, which is a brake signal, is provided to electromagnetic MV 16 under the control of the control node whose output is connected to a control reservoir select valve PVTV 192. The other input to the control reservoir select valve 192 is a control reservoir back-up signal 16 TV from the triple valve.

In normal operations, the select valve 192 selects the output of the control reservoir pressure controller 91 and provides its output to a double check valve 96. The other input of the double check valve 96 is from an emergency valve PVE 95 which receives its control input from a double check 94 which selects the higher of the brake pipe pressure BP or the actuating pipe pressure 13. A regulator valve ELV connects the main reservoir to the emergency valve 95.

The 16 control portion also includes a second brake pipe transducer 71'. Not only does the extra brake pipe transducer 71' act as a back-up to the brake pipe transducer 71 in the brake pipe control module of FIG. 10, but also allows the control node of the 16 control portion to directly and independently determine the brake pipe pressure. The output of the control reservoir pressure controller 91 is provided as a pneumatic signal 16 ERBU to an equalization reservoir back-up electropneumatic valve ERBU 181 which is controlled by the electrical signal 16 ERBU ELECT from the control node of the 16 control portion at connector P170. The equalization reservoir back-up valve 181, as illustrated in FIG. 12, is located in the 13 control portion, transmits the 16 ERBU signal under the control of the electric 16 ERBU ELECT signal as the equalization reservoir back-up signal ERBU to the equalization reservoir select valve in the equalization reservoir control portion ERCP.

Figure 12:
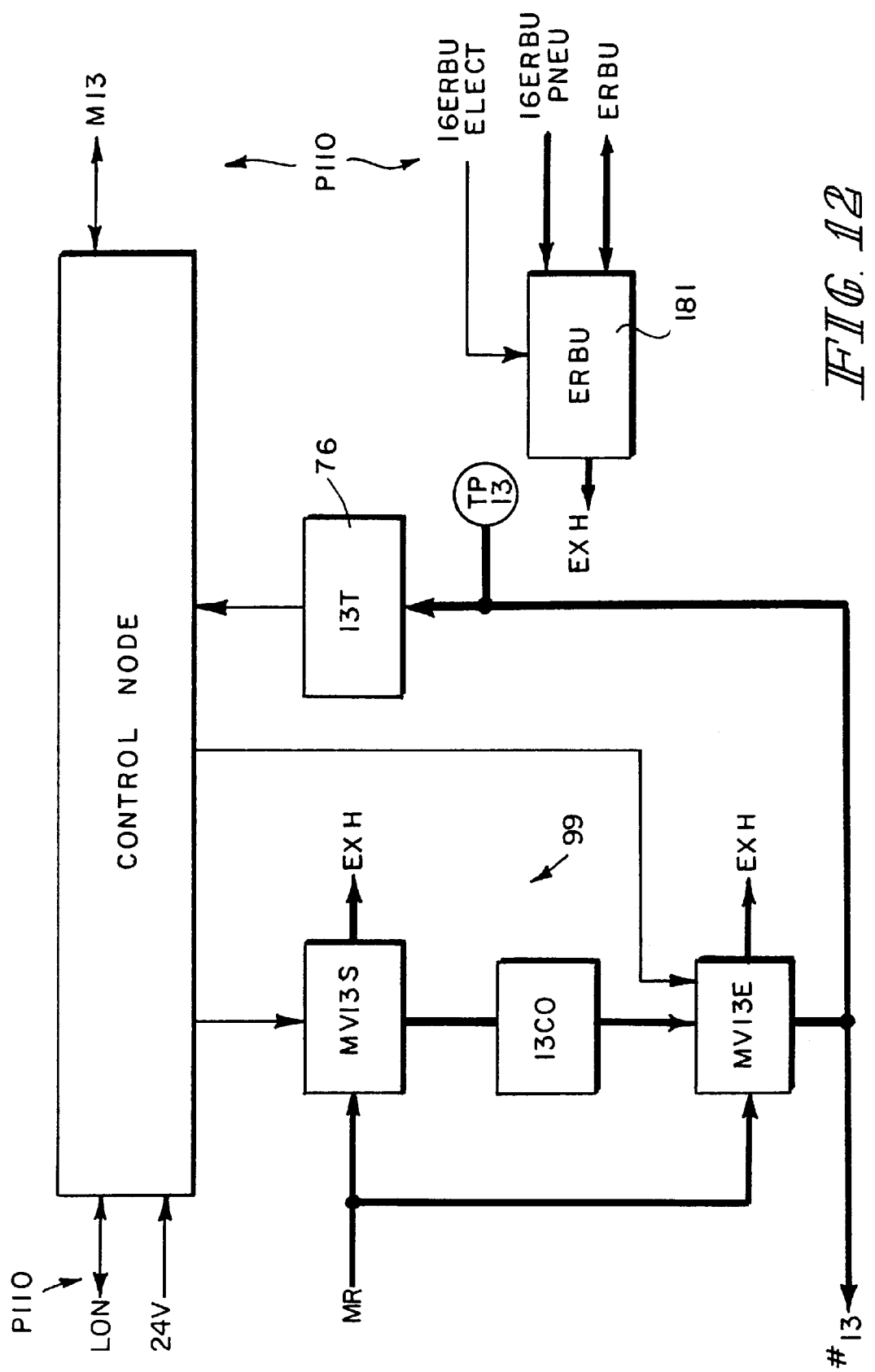
FIG. 12 is a block diagram of the actuating or 13 pipe control portion for use with a cable system of the present invention.

The 13 control or actuating pipe control portion 13CP as illustrated in FIG. 12 includes a control node receiving the LON Network and a 24 volt power line at connector P110. It also receives an electrical input signal MV 13 at connector P110 which is an electrical bailoff signal from the electric brake valve EBV via the relay K1 of the power supply injunction box of FIG. 9. The control module 13CP controls the 13 pipe by an actuating pressure controller 99 which includes an electropneumatic supply valve MV 13S, a pneumatic cut-off valve 13 CO and an electropneumatic vent valve MV 13E. A 13 transducer 76 is connected to the control node and a pressure test point TP13 is also provided in the 13 control portion.

The control nodes of each of the modules or line replacement units of the electropneumatic control are made of a single design. The control node provides electrical control of the control portion and communication by transceivers with other modules as well as the rest of the system by transmitting commands and data over the LonWorks Network. The control node reads analog transducers and drives the magnetic valves on the control portion with its designated function and the commands it has received. The operation of the control node is controlled by software which is reprogrammable in the field.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed:

1. A cable system in an electropneumatic brake unit having electropneumatic valves and electrical sensors mounted on a common manifold, said unit comprising:
   device connectors connected to said electropneumatic valves and electrical sensors at predetermined positions along a path; and
   a wiring harness forming a closed loop of a length sufficient to traverse said path and a plurality of insulated wires in a common sheath selectively connected to harness connectors which are mounted at predetermined positions to said harness and mate with a corresponding device connector.

2. A unit according to claim 1, wherein a majority of said wires in said wiring harness form a corresponding closed loop.

3. A unit according to claim 1, wherein the mounting of said harness connectors to said harness includes a water tight seal.

4. A unit according to claim 3 wherein said mounting of said harness connectors to said harness is molded.

5. A unit according to claim 4 wherein said sheath is discontinuous at said mounting of said harness connectors to said harness to expose said wires and said molded mounting encompasses said exposed wires, the ends of said sheath at said discontinuity and a portion of said harness connectors.

6. A unit according to claim 1, including a junction box on said manifold having a plurality of box connectors interconnected at said junction box, one of said box connectors is positioned along said path and said wiring harness includes a harness connector portioned to mate with said box connector positioned along said path.

7. A unit according to claim 6 wherein said junction box includes an electrical power source connected to said box connector along said path.

8. A cable system for an electropneumatic brake unit having device connectors at predetermined positions along a path and connected to electropneumatic valves and electrical sensors mounted on a common manifold, said cable system comprising:
   a wiring harness having a length sufficient to traverse the path defined by the device connectors and a plurality of insulated wires in a common sheath selectively connected to harness connectors which are mounted at predetermined positions to said harness to mate with a corresponding device connector;
   each of said wires in said harness being connected to more than one of said harness connectors;
   each of said harness connectors including a pin for each wire selectively connected thereto; and
   at least three corresponding pins of said harness connectors being interconnected one to another by a continuous segment of wire of said harness.

9. A cable system according to claim 8 wherein a pair of said wire segments are connected to each selected pin.

10. A cable system according to claim 8 wherein a majority of said wires in said wiring harness form a closed loop of said wire segments.

11. A cable system according to claim 8 wherein said sheath is discontinuous at said mounting of said harness connectors to said harness to expose said wires and said mounting is a molding encompassing said exposed wires, the ends of said sheath at said discontinuity and a portion of said harness connectors.

12. A cable system in an electropneumatic brake unit having electropneumatic valves and electrical sensors mounted on a common manifold, said unit comprising:
   said electropneumatic valves and electrical sensors as well as other electronic devices being grouped into modules mounted to said manifold;
   each module includes only one device connector for connecting all of the electropneumatic valves, electrical sensors and other electronic devices of the module to a harness;
   said device connectors being at predetermined positions along a path; and
   a wiring harness having a length sufficient to traverse said path and a plurality of insulated wires in a common sheath selectively connected to harness connectors which are mounted at predetermined positions to said harness and mate with a corresponding device connector.

13. A unit according to claim 12 including a junction box on said manifold having a plurality of box connectors interconnected at said junction box, one of said box connectors is positioned along said path and said wiring harness includes a harness connector portioned to mate with said box connector positioned along said path.

14. A unit according to claim 12 wherein each module includes a transceiver connected to its device connector.

* * * * *